V. A. FYNN.
DYNAMO ELECTRIC MACHINE.
APPLICATION FILED MAY 26, 1910.

1,006,744.

Patented Oct. 24, 1911.

2 SHEETS—SHEET 1.

WITNESSES:
L. L. Mead.
W. H. Alexander.

INVENTOR
Valère A. Fynn
BY Fowler Huffman
ATTORNEYS

V. A. FYNN.
DYNAMO ELECTRIC MACHINE.
APPLICATION FILED MAY 26, 1910.

1,006,744.

Patented Oct. 24, 1911.

2 SHEETS—SHEET 2.

WITNESSES:
L. L. Mead.
V. A. Alexander.

INVENTOR
Valère A. Fynn,
BY Fowler T. Huffman
ATTORNEYS

UNITED STATES PATENT OFFICE.

VALERE ALFRED FYNN, OF LONDON, ENGLAND, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,006,744.   Specification of Letters Patent.   Patented Oct. 24, 1911.

Application filed May 26, 1910. Serial No. 563,543.

*To all whom it may concern:*

Be it known that I, VALÈRE ALFRED FYNN, a subject of the King of England, residing at London, England, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates more particularly to continuous current generators, but is also applicable to motors.

My object is to provide a generator which will be self-exciting and the excitation of which may be regulated with greater economy than has hitherto been possible.

I aim to provide means whereby the machine may be easily and efficiently compounded or decompounded and means whereby the no-load terminal voltage may be prevented from rising beyond a prescribed maximum value even when the speed at which the machine is driven is varied over a wide range.

Other objects and advantages of my invention will appear from the detailed description thereof taken in conjunction with the accompanying diagrammatic drawings.

Although the drawings illustrate two pole machines the invention is, of course, applicable to machines with any number of pole pairs.

Figure 1:
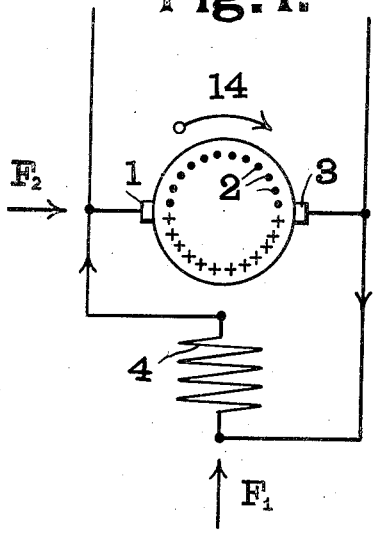
Figure 2:
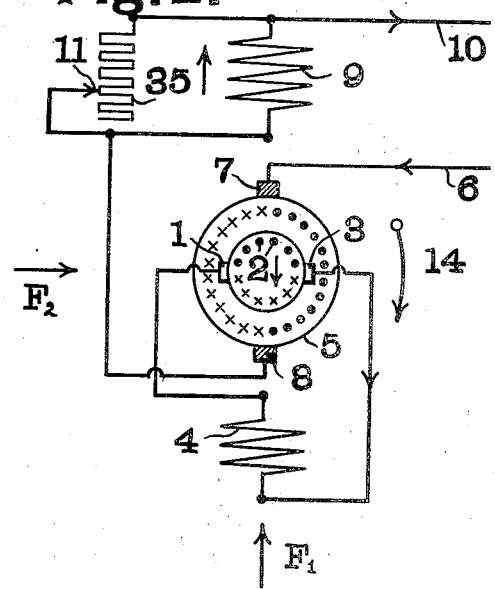
Figure 3:
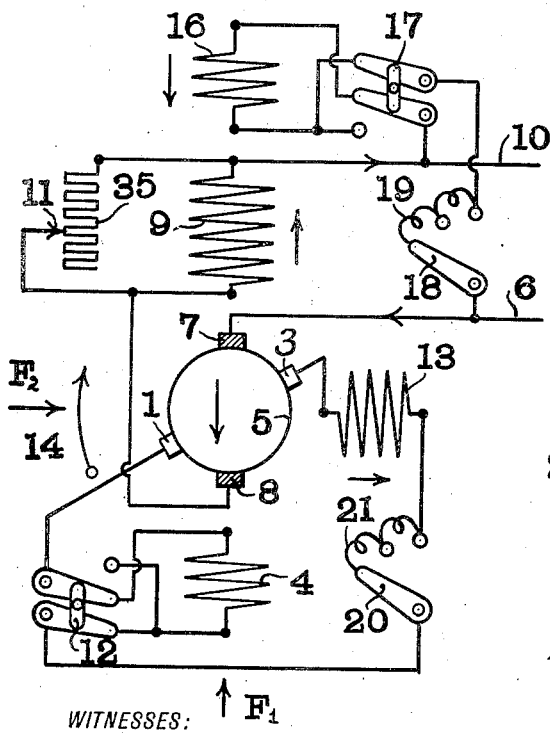
Figure 5:
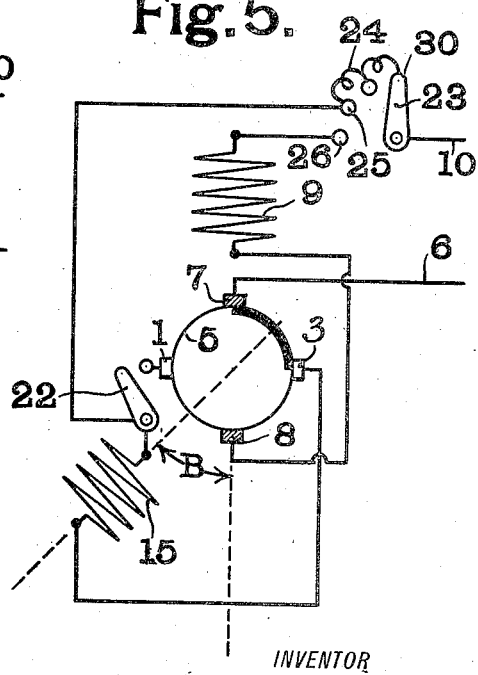
Figure 4:
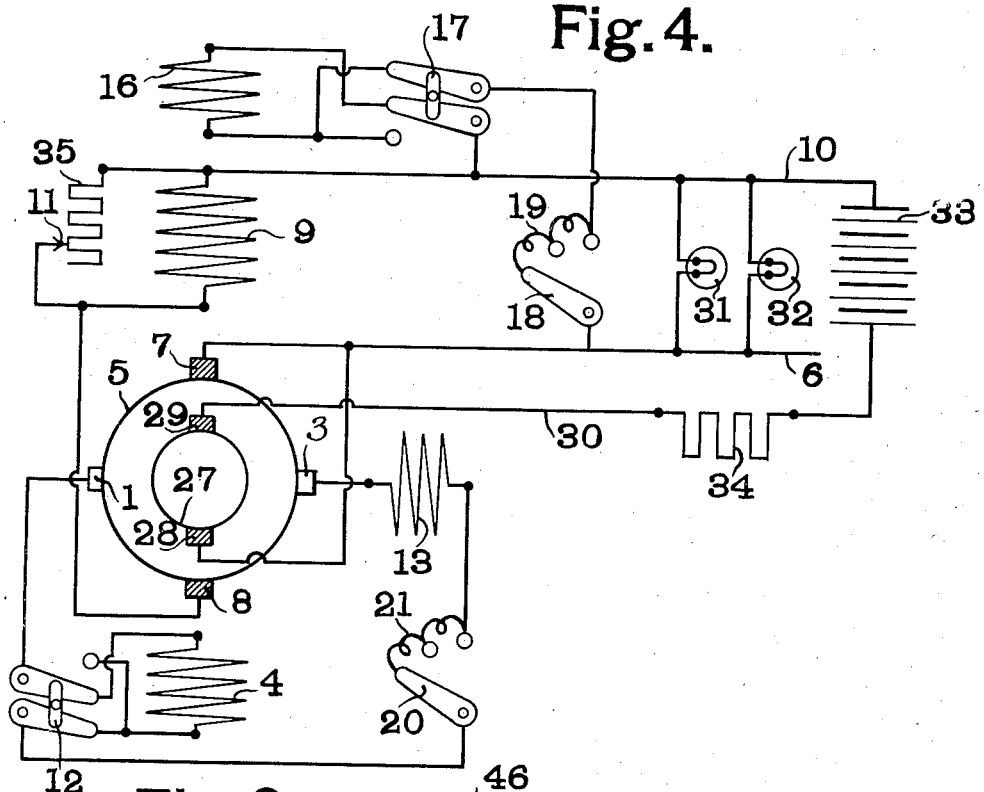
Figure 6:
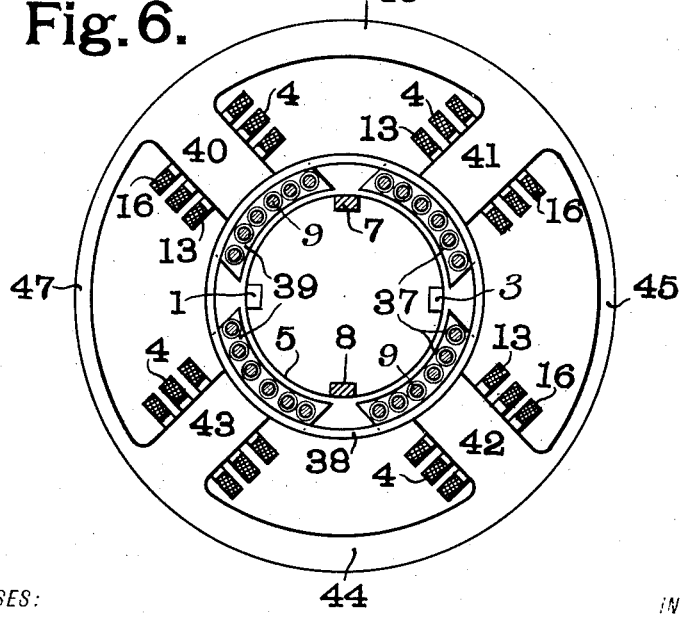

Figure 1 of said drawings is a self-excited shunt dynamo of ordinary construction; Fig. 2 is one form of my improved dynamo showing means for compounding or decompounding the machine; Fig. 3 is another form of my dynamo showing in addition means for limiting or regulating the no-load terminal voltage; Fig. 4 is a modification of Fig. 3; Fig. 5 is another form of my improved dynamo and also illustrates one way of starting the machine as a motor; Fig. 6 shows structural details of one form of my novel dynamo.

In an ordinary shunt dynamo, such as shown in Fig. 1, there is a flux $F_1$ due to the field winding 4, and a flux $F_2$ due to the current flowing through the armature from brush to brush. The flux $F_2$ is often referred to as armature reaction. It is known that such a dynamo is self-exciting provided the brushes 1, 3 resting on the commuted winding 2 are properly connected to the field winding 4. These connections are shown in the figure for the clockwise rotation indicated by arrow 14. In my improved dynamo I make use of the armature reaction flux $F_2$ as the exciting flux of the machine.

In Fig. 2 is shown one way in which I make use in my improved machine of the known structure shown in Fig. 1 in order to achieve my objects. The rotor carries a commuted winding 2 on which rest the brushes 1, 3 which are connected to the stator winding 4 disposed along an axis at right angles to that of the brushes 1, 3. This combination constitutes an ordinary shunt wound self-excited dynamo. The exciting flux for this dynamo is $F_1$; the armature reaction flux is $F_2$. The rotor also carries a commuted winding 5 on which rest the working brushes 7, 8 disposed along the axis of $F_1$. The working E. M. F. is generated in the working winding 5 by rotation in the armature reaction flux $F_2$. A neutralizing winding 9 is arranged coaxially with the working brushes and so connected that its ampere turns shall oppose the working ampere turns on the rotor between the brushes 7 and 8. A resistance 35 is connected in parallel to the neutralizing winding and can be adjusted at 11.

In Fig. 3 only one commuted winding is made use of on the rotor, the exciting brushes 1, 3 being disposed on 5 and displaced by way of example by less than 90 degrees from the working brushes 7, 8. When the exciting brushes are not displaced by 90 electrical degrees from the working brushes then the exciting current produces some ampere turns along the working and some along the exciting axis, i. e., at right angles to the working axis. A stator winding 13 is displaced by 90 electrical degrees from the axis of the working brushes and connected so as to increase $F_2$ whereby the energy required for exciting and for regulating my improved dynamo is still further reduced. A reversing switch 12 is provided so that the dynamo may be operated in either direction of rotation. The resistance 21 controlled by switch 20 allows the exciting current to be adjusted. A winding 16 connected in parallel to the terminals of the machine is disposed coaxially with the primary exciting winding 4. The direction of the magnetization produced by 16 is controlled by the reversing switch 17; its magnitude is controlled by switch 18 coacting with the resistance 19. Since the direction of $F_2$ is reversed when the direction of rotation is reversed it is clear that the working E. M. F. of this dynamo, appearing at the brushes 7, 8 will always be of the same direction unless the remanant magnetism happens to be reversed.

In Fig. 4 the rotor carries two commuted windings 5 and 27 so that three E. M. F.'s of differing magnitude can be obtained from one and the same machine provided the commuted winding 27 has a different number of turns from that of the commuted winding 5. The two commuted windings are connected in series by way of the brushes 8, 7, 28, 29. This form of my improved dynamo is for instance suitable for delivering an E. M. F. to translating devices such as the lamps 31, 32 connected across the mains 10, 6 and at the same time to charge a storage battery such as 33 connected across mains 10, 30. A steadying resistance 34 can be inserted into the battery circuit.

The modification shown in Fig. 5 consists in combining the two stator windings 4 and 13 into one stator winding 15, displaced from the working brushes 7, 8 by the angle B, greater than zero and smaller than 90. This figure also illustrates one way of starting such a machine as a motor. To this end switch 22 is opened and switch 23 is placed on point 30 of the resistance 24. The machine starts as a series motor only part of the rotor winding being in use. This part lies between the brushes 2 and 7 and is indicated by a heavy line. Switch 23 is gradually moved to point 25 while the speed increases. When a sufficient speed has been reached then switch 22 is closed while switch 23 is placed on point 26.

Fig. 6 shows a suitable field structure for my improved dynamo. The frame carries four polar projections 40, 41, 42 and 43 provided with removable and laminated pole shoes 39. These pole shoes have a number of slots 37 and are held together by means of rings 38 and can be easily withdrawn from the field structure. Those parts 46 and 44 of the yoke which join the polar projections 40 and 41, also the projections 42 and 43 have a greater cross section than the parts 45 and 47. The rotor winding 5 is supposed to be of the Gramme ring type with the brushes resting directly on said winding. The windings of Fig. 3, for instance, are disposed on such a structure as follows: The neutralizing winding 9 is wound into slots 37 and arranged to magnetize along the axis 7, 8. Each of the polar projections carries part of the windings 4, 16 and 13. The coils 13 are so connected as to magnetize the rotor along the axis 1, 3. The flux they produce is the larger flux $F_2$, and closes through the parts 44 and 46 of the yoke. Coils 4 are so connected as to magnetize the rotor along the axis 7, 8, while the coils 16 are connected to magnetize along the same axis but in an opposite direction. The flux along that axis is the small flux $F_1$. It closes through parts 45 and 47 of the yoke.

In explaining the operation of my machine I will first refer to Fig. 2 where the commuted winding 2 may be termed the secondary exciting winding and where 1, 3 may be referred to as the exciting brushes of my improved dynamo while 4 can be spoken of as the primary exciting winding. The flux $F_1$ is then the primary and the flux $F_2$ the secondary exciting flux of the machine. The relative positions of the various windings and brushes shown is the preferred one although they may be somewhat displaced if desired or convenient. The output of the self-exciting dynamo constituted by brush 1, commuted winding 2, brush 3 and exciting winding 4 embodied in my machine is obviously quite small for it is only called upon to provide the energy necessary to produce the secondary exciting flux $F_2$. Since a small output requires only a small exciting flux then $F_1$ need only be small as compared to $F_2$. According to this invention I adjust the characteristic of my machine to whatever form I desire not by directly influencing its exciting flux which in this case is what I have arbitrarily termed the secondary exciting flux $F_2$ but by directly influencing the smaller or primary exciting flux $F_1$. It is clear that the smaller flux $F_1$ can be influenced with the help of comparatively few ampere turns and therefore with a smaller expenditure of energy for a given weight of copper than would be the case if an attempt were made to influence the larger flux $F_2$ directly. Any alteration of $F_1$ whether brought about by a change in speed or whether due to any other cause will be faithfully reflected in a corresponding alteration of $F_2$. Assuming the speed to be constant then an increase of $F_1$ will cause an increase of the voltage generated at the brushes 1, 3. This increased voltage will cause a larger current to flow in the circuit 1, 2, 3 and 4, thus increasing not only $F_2$ but also $F_1$ thus again increasing the voltage at 1 and 3. It is seen that the effect is to a certain degree cumulative. A decrease of $F_1$ will similarly cause a reduction of $F_2$. It is by helping or opposing the ampere turns due to 4 that I vary the magnitude of $F_1$ for the purpose of regulating the voltage at the terminals of my dynamo or of adjusting its characteristic. I make this regulation of $F_1$ either dependent on the load current or on the terminal E. M. F. or on both. Fig. 2 shows one way of making this regulation dependent on the load current. To achieve this, I adjust the relative number of ampere turns in my neutralizing winding 9 and my rotor working winding 5. This adjustment can be easily made in a machine of a given design even without altering its windings. To this end I make the number of turns in 9 larger than the effective opposing turns of 5 and I connect a resistance 35 in parallel with 9. When 9 is not shunted by this resistance then the flux $F_1$ is increased with increasing load and the E. M. F. impressed on the mains 6, 10 tends to rise, the dynamo thus being compounded or over compounded. If so much of 35 is inserted as to make the ampere turns of 9 about equal to those of 5 then the machine will behave like an ordinary self-excited shunt dynamo. If 35 is further reduced, making the ampere turns in 9 smaller than those in 5 then $F_1$ will be decreased with increasing load for the ampere turns of 5 now overpower those of 4, and the machine will be decompounded. $F_1$ being small as compared to $F_2$ a small difference between the ampere turns of 5 and 9 will produce great variations in the magnitude of $F_1$.

In order to make the regulation of $F_1$ dependent on the terminal voltage, I make use of the winding 16 connected to an E. M. F. generated in any part of the rotor working winding 5. Fig. 3 shows such an arrangement where 16 is connected in parallel to the mains, i. e. in parallel to the whole of the working winding 5.

The working E. M. F. generated at the brushes 7, 8 or in any part of the commuted winding 5 rises faster with increasing speed than does the exciting E. M. F. at the brushes 1, 3. This can be simply demonstrated by assuming the flux $F_1$ as constant when the exciting E. M. F. as well as $F_2$ will be proportional to the speed, while the working E. M. F. will be proportional to the speed and to $F_2$. Since $F_2$ is already proportional to the speed then the working E. M. F. must be proportional to the square of the speed. If $F_1$ is not constant then its variation will be reflected in a variation of $F_2$ and of the working E. M. F. but the latter will nevertheless vary faster than the exciting E. M. F. I make use of this condition to make the regulation of $F_1$ dependent on the value of the terminal voltage of my improved dynamo.

According to the position of switch 17 the winding 16 will either help or oppose the winding 4. By opposing 16 to 4 the terminal voltage can be prevented from rising to undue values when the speed rises even if the machine runs idle, because with increasing speed the ampere turns in 16 will rise more rapidly than those in 4. The relation of the terminal voltage to the speed can be varied in many ways by proportioning 16 accordingly. The terminal voltage can indeed be kept fairly constant over a wide range of speeds, particularly if the ampere turns required for producing $F_1$ are small, whereas the total ampere turns in 4 and the total opposing ampere turns in 16 are made comparatively large.

Thus it will be seen that the dynamo shown in Fig. 3 can be designed to have either a rising, a falling or a straight characteristic under load by suitably choosing the ampere turns of 9 relatively to those of 5 and that the maximum terminal voltage of this machine can be kept within prescribed limits by means of the winding 16 even if the speed is varied over a wide range. The maximum variation of the terminal voltage for a certain range of speeds can be kept within narrow limits even independently of the load current.

Having fully described my invention, what I claim as new and desire to secure by Letters Patent of the United States, is:

1. In a dynamo electric machine, the combination with a stationary member provided with a neutralizing winding and a coaxially disposed exciting winding, of a revolving member having working brushes connected in series with the neutralizing winding, and means connected in series with the exciting winding for producing all the flux which threads the machine at right angles to the axis of the neutralizing winding.

2. In a dynamo electric machine, the combination with a stationary member provided with an exciting winding and a neutralizing winding, of a revolving member having exciting brushes displaced from the axis of the exciting winding and in circuit with said winding, said exciting brushes being connected to carry all the current producing the flux which threads the machine at right angles to the neutralizing winding, and working brushes displaced from the exciting brushes and connected in series with the neutralizing winding.

3. In a dynamo electric machine, the combination with a stationary member provided with an exciting winding, a regulating winding and a neutralizing winding, of a revolving member having exciting brushes displaced from the axis of the exciting winding and in circuit with said winding, said exciting brushes being connected to carry all the current producing the flux which threads the machine at right angles to the neutralizing winding and working brushes displaced from the exciting brushes and connected in series with the neutralizing winding.

4. In a dynamo electric machine, the combination with a stationary member provided with an exciting winding and a neutralizing winding, of a revolving member having working brushes and exciting brushes, said exciting brushes being displaced from the axis of the exciting winding and in circuit with said winding, said exciting brushes being connected to carry all the current producing the flux which threads the machine at right angles to the neutralizing winding, the working brushes being displaced from the exciting brushes and connected in series with the neutralizing winding, and means for adjusting the ampere turns of the neutralizing winding.

5. In a dynamo electric machine, the combination with a stationary member provided with a primary exciting winding and a neutralizing winding, of a revolving member having working brushes and exciting brushes, the exciting brushes being displaced from the axis of the primary exciting winding and in circuit with said winding, said exciting brushes being connected to carry all the current producing the flux which threads the machine at right angles to the neutralizing winding, the working brushes being displaced from the exciting brushes and connected in series with the neutralizing winding, and an auxiliary exciting winding on the stationary member coaxial with the exciting brushes.

6. In a dynamo electric machine, the combination with a stationary member provided with an exciting winding and a neutralizing winding, of a revolving member having working brushes and exciting brushes the exciting brushes being displaced from the axis of the exciting winding and in circuit with said winding, said exciting brushes being connected to carry all the current producing the flux which threads the machine at right angles to the neutralizing winding, the working brushes being displaced from the exciting brushes and connected in series with the neutralizing winding, a regulating winding on the stationary member, and means for adjusting the ampere turns of the neutralizing winding.

7. In a dynamo electric machine, the combination with a stationary member provided with a primary exciting winding, a neutralizing winding and a regulating winding, of a revolving member having working brushes and exciting brushes, the exciting brushes being displaced from the axis of the primary exciting winding and in circuit with said winding, said exciting brushes being connected to carry all the current producing the flux which threads the machine at right angles to the neutralizing winding, the working brushes being displaced from the exciting brushes and connected in series with the neutralizing winding, and an auxiliary exciting winding on the stationary member coaxial with the exciting brushes.

8. In a dynamo electric machine, the combination with a stationary member provided with a primary exciting winding, a neutralizing winding and a regulating winding, of a revolving member having working brushes and exciting brushes the exciting brushes being displaced from the axis of the primary exciting winding and in circuit with said winding, said exciting brushes being connected to carry all the current producing the flux which threads the machine at right angles to the neutralizing winding, the working brushes being displaced from the exciting brushes and connected in series with the neutralizing winding, an auxiliary exciting winding on the stationary member coaxial with the exciting brushes, and means for adjusting the ampere turns of the neutralizing winding.

9. In a dynamo electric machine, the combination with a stationary member provided with a neutralizing winding and a coaxial exciting winding, of a revolving member provided with a commuted winding having exciting brushes in circuit with said exciting winding and displaced from the axis thereof by approximately 90 electrical degrees, said exciting brushes being connected to carry all the current producing the flux which threads the machine at right angles to the neutralizing winding, and working brushes displaced from the exciting brushes and connected in series with the neutralizing winding.

10. In a dynamo electric machine, the combination with a stationary member provided with a neutralizing winding and a coaxial exciting winding, of a revolving member provided with a commuted winding, having working brushes and exciting brushes, the exciting brushes being in circuit with said exciting winding and displaced from the axis thereof by approximately 90 electrical degrees, said exciting brushes being connected to carry all the current producing the flux which threads the machine at right angles to the neutralizing winding, the working brushes being displaced from the exciting brushes and connected in series with the neutralizing winding, and a regulating winding on the stationary member coaxially disposed with reference to the neutralizing winding and connected to the mains.

11. In a dynamo electric machine, the combination with a stationary member provided with a neutralizing winding, a primary exciting winding coaxial therewith and an auxiliary exciting winding displaced therefrom by about 90 electrical degrees, of a revolving member provided with a commuted winding having exciting brushes in circuit with the primary and the auxiliary exciting windings and coaxially disposed with reference to said auxiliary exciting winding said exciting brushes being connected to carry all the current producing the flux which threads the machine at right angles to the neutralizing winding, and working brushes displaced from the exciting brushes and connected in series with the neutralizing winding.

12. In a dynamo electric machine, the combination with a stationary member provided with a neutralizing winding and a coaxially disposed exciting winding, of a revolving member provided with a commuted winding, having working brushes and exciting brushes, the exciting brushes being in circuit with said exciting winding and displaced from the axis thereof by approximately 90 electrical degrees, said exciting brushes being connected to carry all the current producing the flux which threads the machine at right angles to the neutralizing winding, the working brushes being displaced from the exciting brushes and connected in series with the neutralizing winding, and means for adjusting the ampere turns of the neutralizing winding.

13. In a dynamo electric machine, the combination with a stationary member provided with a neutralizing winding, a primary exciting winding coaxial therewith and an auxiliary exciting winding displaced therefrom by about 90 electrical degrees, of a revolving member provided with a commuted winding having exciting brushes in circuit with the primary and the auxiliary exciting windings and coaxially disposed with reference to said auxiliary exciting winding said exciting brushes being connected to carry all the current producing the flux which threads the machine at right angles to the neutralizing winding, and working brushes displaced from the exciting brushes and connected in series with the neutralizing winding, and a regulating winding on the stationary member coaxially disposed with reference to the neutralizing winding.

14. In a dynamo electric machine, the combination with a stationary member provided with a neutralizing winding and a coaxial exciting winding, of a revolving member provided with two commuted windings having on one commuted winding exciting brushes connected to said exciting winding and displaced from the axis thereof by approximately 90 electrical degrees and working brushes on both commuted windings displaced from the exciting brushes and connected in series with the neutralizing winding.

15. In a dynamo electric machine, the combination with a stationary member provided with a neutralizing winding and a coaxial exciting winding, of a revolving member provided with two commuted windings having on one commuted winding exciting brushes connected to said exciting winding and displaced from the axis thereof by approximately 90 electrical degrees and working brushes on both commuted windings displaced from the exciting brushes and connected in series with the neutralizing winding, and a regulating winding on the stationary member coaxially disposed with the neutralizing winding.

In testimony whereof, I have hereunto set my hand and affixed my seal in the presence of the two subscribing witnesses.

VALÈRE ALFRED FYNN. [L. S.]

Witnesses:
  E. E. HUFFMAN,
  ELIZABETH BAILEY.